May 26, 1942. W. J. WADE 2,283,960
FISH LURE
Filed Jan. 3, 1940
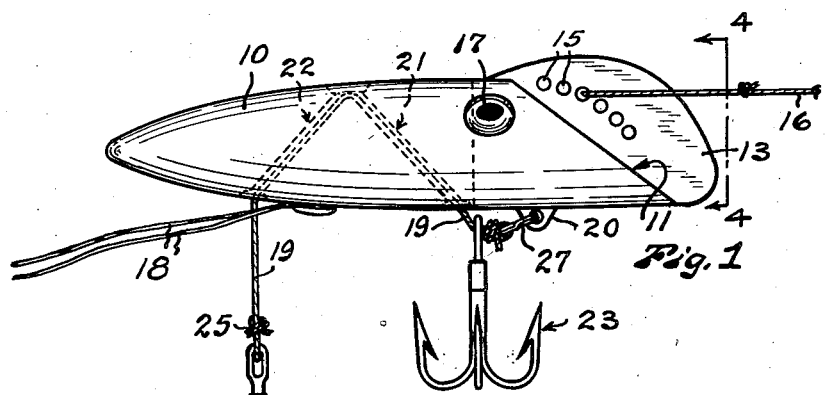
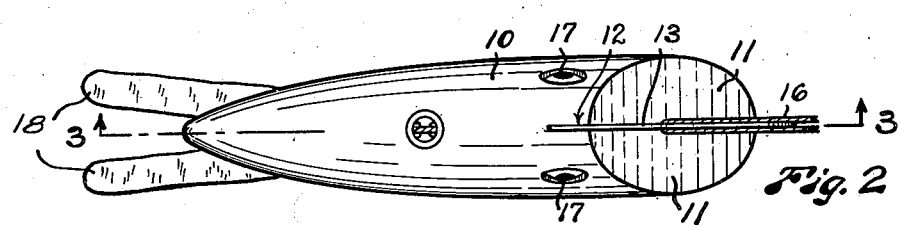
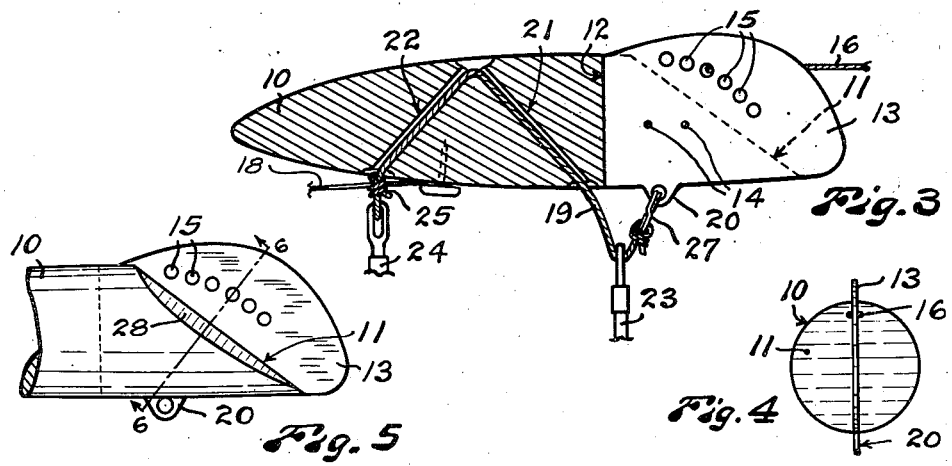
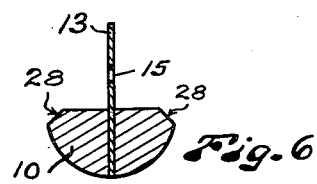
INVENTOR.
William J. Wade
BY Fred C. Matheny
ATTORNEY Patented May 26, 1942

2,283,960

UNITED STATES PATENT OFFICE 2,283,960

FISH LURE

William J. Wade, Seattle, Wash.

Application January 3, 1940, Serial No. 312,244

7 Claims. (Cl. 43—46)

This invention relates to fish lures of the type commonly called trolling plugs.

An object of this invention is to provide a trolling plug that will have a combined darting and wabbling or oscillating movement when it is drawn through the water to simulate the movement of a stunned or wounded fish, it have been found that such a movement is effective in attracting large fish and causing them to strike at the plug.

Another object is to provide a fish lure of the plug type which has a novel arrangement of water reaction surfaces for securing a combined darting and wabbling motion of the lure in the water.

Another object is to provide a fish lure of the plug type having an inclined plane flat front end portion provided with a perpendicularly disposed plate member which extends outwardly a substantial distance from said inclined front end portion and functions as a rudder and as a flasher plate and as a line attaching means, said plate having a plurality of spaced apart line receiving holes positioned adjacent the inclined end portion of the lure with the major portion of said plate forward of said holes to provide water reaction surfaces forward of the point of connection of the lure with the line, the holes providing a means of adjustment of the line to govern the amplitude of darting movement of the lure.

Another object is to provide a fish lure comprising a tapered plug shaped body member of substantially circular cross section having an inclined plane flat front end portion presenting a surface of substantially elliptical outline which inclined surface is unobstructed except for the combined flasher and rudder plate that is secured to the body member and coincides with the major axis of said portion of oval shaped outline and extends perpendicularly from said portion of oval shaped outline and has the spaced holes for the adjustable attachment of a trolling line.

Another object of the invention is to provide novel means for connecting fish hooks with this plug or lure in such a manner as to support the hooks close to the lure and yet allow enough lost motion to provide clearance between the lure and the head of any fish that has taken one of the hooks.

Other objects of the invention will be apparent from the following description and accompanying drawing.

In the drawing, Fig. 1 is a side elevation of a fish lure constructed in accordance with this invention.

Fig. 2 is a top plan view of the same.

Fig. 3 is a sectional view with parts in elevation substantially on broken line 3—3 of Fig. 2.

Fig. 4 is an end elevation looking in the direction indicated by broken line 4—4 of Fig. 1.

Fig. 5 is a fragmentary side elevation of a modified form of the invention.

Fig. 6 is a sectional view substantially on broken line 6—6 of Fig. 5.

Figs. 1 to 4 show a fish lure of the plug type comprising a plug shaped body member 10 convergently tapered toward its rear end and of substantially circular cross section.

The forward end of the plug 10 is cut on a plane that is oblique to the axis of said plug to provide on the plug a plane flat inclined surface 11 that extends entirely across the end of the plug and is free from shoulders and obstructions.

Cutting the substantially circular body member on an inclined or oblique plane provides an inclined surface 11 with an oval or substantially elliptical outline. The forward tip of this oval is at the lower portion of the body member and the rearmost tip of said oval is at the top of said body member.

A narrow transverse slot 12 is provided in the body member 10 coincident with the major axis which extends through the two tip portions of the oval shaped inclined surface 11. The slot 12 extends back into the body member 10 beyond the rear tip of the inclined surface 11.

A thin flat metallic plate member 13 of light reflecting material is positioned in the slot 12 and fixedly secured to the body member 10 by transverse pins 14. The forward end portion of the plate member 13 is rounded, as shown, and projects a substantial distance forwardly from the body member to provide on the front end of the body member a combined rudder member and flasher plate.

A plurality of trolling line attachment holes 15 are provided in the plate 13 adjacent the inclined surface 11 of the body member and a substantial distance back from the front edge of the plate. A trolling line or leader 1 is attached in one of the holes 15, depending on the amplitude of darting action desired. When the line 16 is engaged in one of the upper holes 15 substantially all of the exposed portion of the plate 13 entirely to the lowermost forward tip thereof is in front of the point of connection of the line 16 with the plate 13 and a maximum amplitude or width of darting action is secured. When the line is engaged in one of the lower holes 15 then less of the exposed portion of the plate 13 will be forward of the point of connection of the line 16 with the plate 13 and the lure will not dart so far to each side and can be drawn through the water at a faster speed either in trolling or casting.

Eyes 17 of conventional form are provided on the body member 11 to make the lure look more like a fish and said body is painted or enameled in any suitable manner to make it attractive. Also preferably flexible tail means 18 of thin rubber of well known type is secured to the rear portion of body member 11.

A fish hook supporting line 19 is attached to a perforated lug 20 on the lower edge of the plate member 13, by means such as a split ring 27.

A passageway is provided in the body member 10 to the rear of the lug 20 for the hook supporting line 19 to pass through. This passageway may take different shapes but preferably I construct the same by providing two relatively inclined bores 21 and 22 that are spaced apart at their lower ends and substantially intersect each other at the upper portion of the body member 10. These bores provide a passageway of inverted V shape for the line 19 to run through. This passageway has two spaced apart openings on the bottom portion of the body member, one toward the forward end and the other toward the rear end of said body member.

One hook member 23 is slidable on the line 19 between the passageway 21 and point of attachment of the front end of said line 19 to the body member 10. Another hook member 24 is secured to said line 19 to the rear of the passageway 22. A knot 25 may be used in connecting the rear hook member 24 to the line 19 and this knot may serve as a stop means to limit the distance that the line 19 can be drawn through the passageways 21—22 by a pull on the front hook member 23. For a lure of medium size the knot 25 will preferably be positioned so as to allow for from one inch to one and one half inches slackness in the line 19. This will position the rear hook 23 close to the lure and will allow for enough slackness in the loop that holds the forward hook 24 so that a fish that grabs the forward hook 24 can not pull loose from said hook 24 by prying with his nose and head against the body member 10. The forward hook 24 will first yield and then suddenly stop when grabbed by a fish and this will tend to set the hook when the fish strikes.

When this lure is drawn through the water in trolling or casting the weight of the hooks will tend to hold it in the position shown in Fig. 1, and will help to prevent it from turning over. The force exerted by the water on the inclined surface 11 will be downward and will hold the lure beneath the surface of the water.

Trolling depth will also be somewhat governed by adjustment of the line 16 in the holes 15, the lure tending to go deeper when line 16 is engaged in the upper holes 15, it being apparent that engagement of the line 16 in different holes 15 will change both the location of the line of pull of the line 16 as respects the plug and the location of the pivot formed by said line relative to both the inclined surface 11 and the water reaction surfaces of the plate 13.

The lure will not troll straight through the water because the water pressures thereon will never be exactly balanced but said lure, when moved in the water, will always start to run or dart to one side of the line of pull. When said lure thus starts to run to one side of the line of pull the water pressure on one side of the plate 13, and especially on those portions of one side of said plate 13 forward of the point of attachment of the line 16, will be increased and the lure will run to that side until the side pull on the line 16 is strong enough to turn the lure and start it toward the other side of the line of pull in which direction it will run until reversed.

At the same time the lure is darting from side to side it will oscillate on its longitudinal axis, due to unbalance of the water pressure on the surfaces 11 on the two sides of the plate 13. A combined darting and wabbling movement simulating the irregular movement of a stunned or wounded fish is thus given to the lure.

The lure shown in Figs. 5 and 6 is similar to the one shown in Figs. 1 to 4 except that the peripheral edges of the inclined plane surface 11 are cut away to provide beveled surfaces 28. I have found that where these edges are beveled in this manner the plug will have an action in the water similar to the action of the plug shown in Figs. 1 to 4 but will be more satisfactory for slow trolling or casting speeds.

The foregoing description and accompanying drawing clearly disclose a preferred embodiment of my invention but it will be understood that this disclosure is merely illustrative and that changes in the invention may be made within the scope and spirit of the following claims.

I claim:

1. A fish lure comprising a body member of substantially circular cross section having an inclined plane flat front end portion of substantially elliptical outline disposed in a plane that cuts the body member obliquely from one side to an opposite side thereof; and a plate rigid with said body member coincident with the major axis of said plane flat front end portion and protruding perpendicularly from said plane flat front end portion a substantial distance, said plate having a plurality of holes therein adjacent the body member for connection of a trolling line therewith at different selected locations, said plate having a substantial portion thereof positioned forward of said holes providing water reactance surface forward of the point of connection of the trolling line for controlling the movement of said lure when it is drawn through the water by said line.

2. A fish lure comprising a body member of substantially circular cross section having an inclined plane flat front end portion of substantially elliptical outline disposed in a plane that cuts the body member obliquely from one side to an opposite side thereof; a flasher plate of light reflecting metal rigid with said body member coincident with the major axis of said plane flat front end portion and protruding perpendicularly from said plane flat front end portion a substantial distance; a trolling line connected with said plate adjacent said body member leaving a substantial area of said plate forward of the point of connection of said trolling line to provide a rudder like action helping to govern the movement of the lure in the water; and metallic hook means suspended from the bottom portion of said lure tending by gravity to position said lure with said inclined plane flat front end portion uppermost in the water.

3. A fish lure comprising a body member of substantially circular cross section having an inclined plane flat front end portion of substantially elliptical outline disposed in a plane that cuts said body member obliquely from one side to an opposite side thereof, the edges of said inclined front end portion being beveled off; and a combined flasher and rudder plate secured to said body member and coinciding with the major axis of said plane flat front end portion and protruding perpendicularly from said inclined plane flat front end portion, said plate having a plurality of holes therein adjacent the body member for selective attachment of a trolling line.

4. A fish lure comprising a plug shaped body; line attaching means on the under side of said body near the front end thereof; a line having its forward end attached to said line attaching means; means forming a passageway in said body to the rear of said line attaching means through which said line extends; a hook slidably supported on said line between said line attaching means and said passageway; and means connected with said line to the rear of said passageway limiting movement of said line through said passageway whereby a predetermined amount of slackness is provided between said slidably supported hook and said plug shaped body in the event of a pull on said hook.

5. A fish lure comprising a plug shaped body; a line having its forward end attached to the under side of said body near the front end thereof; means forming a passageway in said body to the rear of the point of attachment of said line, said line extending slidably through said passageway and being permanently retained in said passageway; a hook slidable on said line between said passageway and the point of attachment of said front end portion of said line; and another hook secured to said line to the rear of said passageway.

6. A fish lure comprising a plug shaped body; a line having its forward end attached to the under side of said body near the front end thereof; two intersecting bores forming a passageway of substantially inverted V shape in said body to the rear of the point of attachment of said line, said line extending through said passageway; a hook slidably supported on said line between said passageway and the point of attachment of said line; and another hook secured to said line to the rear of said passageway.

7. A fish lure comprising a body member of substantially circular cross section having an inclined plane flat front end portion of substantially elliptical outline disposed in a plane that cuts said body member obliquely; a combined flasher and rudder plate secured to said body member coincident with the major axis of said plane flat front end portion and protruding perpendicularly from said inclined plane flat front end portion, said plate having a plurality of holes therein adjacent the body member for the selective attachment thereto of a trolling line; a hook supporting line having its forward end attached to the under side of the body near the front end thereof; means forming a passageway in said body to the rear of the point of attachment of said hook supporting line, said passageway being in the plane of said plate and having two openings on the bottom portion of said body member and said line passing through said passageway; a hook slidable on said hook supporting line between the passageway and the point of attachment of the line; and another hook secured to said hook supporting line to the rear of said passageway.

WILLIAM J. WADE.